United States Patent
Kley

(10) Patent No.: US 6,998,689 B2
(45) Date of Patent: Feb. 14, 2006

(54) FLUID DELIVERY FOR SCANNING PROBE MICROSCOPY

(75) Inventor: Victor B. Kley, Berkeley, CA (US)

(73) Assignee: General Nanotechnology LLC, Berkeley, CA (US)

(*) Notice: Subject to any disclaimer, the term of this patent is extended or adjusted under 35 U.S.C. 154(b) by 0 days.

(21) Appl. No.: 10/659,737

(22) Filed: Sep. 9, 2003

(65) Prior Publication Data

US 2004/0118192 A1 Jun. 24, 2004

Related U.S. Application Data

(60) Provisional application No. 60/409,403, filed on Sep. 9, 2002, and provisional application No. 60/433,242, filed on Dec. 12, 2002.

(51) Int. Cl.
- B81B 7/00 (2006.01)
- B81B 7/02 (2006.01)
- G01N 13/10 (2006.01)
- B81C 5/00 (2006.01)
- B82B 3/00 (2006.01)

(52) U.S. Cl. .......... 257/414; 29/700; 250/306; 435/6; 435/287.2; 435/288.4; 977/DIG. 1

(58) Field of Classification Search .......... 257/414; 73/105; 250/306; 435/6, 287.2, 288.4, 288.5; 29/700; 137/557; 977/DIG. 1, 716 H, 717 R, 977/710 W, 711 C See application file for complete search history.

(56) References Cited

U.S. PATENT DOCUMENTS

| | | | |
|---|---|---|---|
| 3,586,865 A | 6/1971 | Baker et al. | 250/214.56 |
| 3,812,288 A | 5/1974 | Walsh et al. | 378/98.6 |
| 4,115,806 A | 9/1978 | Morton | 382/317 |
| 4,604,520 A | 8/1986 | Pohl | 250/216 |
| 4,672,559 A | 6/1987 | Jansson et al. | 382/128 |
| 4,673,477 A | 6/1987 | Ramalingam et al. | 204/192.38 |
| RE32,457 E | 7/1987 | Matey | 250/306 X |

(Continued)

FOREIGN PATENT DOCUMENTS

| WO | WO03/046473 | 6/2003 |
|---|---|---|
| WO | WO04/023490 | 3/2004 |

OTHER PUBLICATIONS

Ager et al., "Multilayer hard carbon films with low wear rates," *Surface and Coatings Technology*, 91:91–94 (1997), month not given.

Betzig et al "Near–Field Optics: Microscopy Spectroscopy and Surface Modification Beyond the Diffraction Limit" Science 257:(1992), Jul. pp. 189–195.

Dai et al. "Nanotubes as nanoprobes in scanning probe microscopy," Nature 384:147–150 (1996), Nov. partially illegible.

(Continued)

*Primary Examiner*—Thomas P. Noland
(74) *Attorney, Agent, or Firm*—Townsend and Townsend and Crew LLP

(57) ABSTRACT

The following invention pertains to the introduction of a gas (or fluid) around a SPM probe or nanotool™ to control chemical activity e.g. oxygen to promote oxidation, argon to inhibit oxidation or clean dry air (CDA) to inhibit moisture to control static charging due to the action of the probe or nanotools and to provide vacuum at and around the tip and substrate area. The invention can also produce electrical current for use with active electronic devices on, in or near the body of the device. In addition by use of a fluid like water, certain oils, and other liquids in conjunction with specific tip structure either electric discharge machining can be used at the tip area on the tip itself (in conjunction with a form structure on the work piece) or on a work piece beneath the tip to shape, polish and remove material at very small scales (10 microns to 1 nm or less).

20 Claims, 8 Drawing Sheets

U.S. PATENT DOCUMENTS

| | | | | |
|---|---|---|---|---|
| 4,681,451 | A | 7/1987 | Guerra et al. | 356/600 |
| 4,697,594 | A | 10/1987 | Mayo, Jr. | 600/443 |
| 4,793,201 | A | 12/1988 | Kanai et al. | 74/89.43 |
| 4,831,614 | A | 5/1989 | Duerig | 250/306 X |
| 4,866,986 | A | 9/1989 | Cichanski | 73/600 |
| 4,907,195 | A | 3/1990 | Kazan et al. | 250/306 X |
| 4,924,091 | A | 5/1990 | Hansma et al. | 250/306 |
| 4,954,704 | A | 9/1990 | Elings et al. | 250/306 X |
| 4,999,495 | A | 3/1991 | Miyata et al. | 250/306 |
| 5,001,344 | A | 3/1991 | Kato et al. | 250/307 |
| 5,010,249 | A | 4/1991 | Nishikawa | 216/11 |
| 5,015,850 | A | 5/1991 | Zdeblick | 250/306 |
| 5,018,865 | A | 5/1991 | Ferrell et al. | 356/600 |
| 5,025,346 | A | 6/1991 | Tang | 361/283.1 |
| 5,038,322 | A | 8/1991 | Van Loenen | 250/306 X |
| 5,043,577 | A | 8/1991 | Pohl | 250/306 |
| 5,047,633 | A | 9/1991 | Finlan et al. | 250/306 |
| 5,047,649 | A | 9/1991 | Hodgson et al. | 250/306 X |
| 5,072,116 | A | 12/1991 | Kawade et al. | 250/306 |
| 5,081,390 | A | 1/1992 | Elings et al. | 310/328 |
| 5,105,305 | A | 4/1992 | Betzig et al. | 359/368 |
| 5,107,112 | A | 4/1992 | Yanagisawa et al. | 250/306 |
| 5,108,865 | A | 4/1992 | Zwaldo et al. | 430/128 |
| 5,118,541 | A | 6/1992 | Yamamoto et al. | 428/648 |
| 5,138,159 | A | 8/1992 | Takase et al. | 250/306 |
| 5,142,145 | A | 8/1992 | Yasutake | 250/306 |
| 5,148,308 | A | 9/1992 | Kopelman | 359/432 |
| 5,155,589 | A | 10/1992 | Gere | 348/29 |
| 5,166,520 | A | * 11/1992 | Prater et al. | 250/306 |
| 5,187,367 | A | 2/1993 | Miyazaki | 250/306 |
| RE34,214 | E | 4/1993 | Carlsson et al. | 348/79 |
| 5,210,410 | A | 5/1993 | Barrett | 250/306 X |
| 5,216,631 | A | 6/1993 | Sliwa | 365/174 |
| 5,220,555 | A | 6/1993 | Yanagisawa | 369/126 |
| 5,231,286 | A | 7/1993 | Kajimura et al. | 250/306 X |
| 5,241,527 | A | 8/1993 | Eguchi | 250/306 X |
| 5,249,077 | A | 9/1993 | Laronga | 359/385 |
| 5,252,835 | A | 10/1993 | Lieber et al. | |
| 5,253,515 | A | 10/1993 | Toda et al. | |
| 5,254,209 | A | 10/1993 | Schmidt et al. | 216/2 |
| 5,254,854 | A | 10/1993 | Betzig | 250/306 X |
| 5,260,824 | A | 11/1993 | Okada et al. | 73/105 X |
| 5,276,672 | A | 1/1994 | Miyazaki et al. | 250/306 X |
| 5,278,704 | A | 1/1994 | Matsuda et al. | 360/55 |
| 5,283,437 | A | * 2/1994 | Greschner et al. | 250/306 |
| 5,289,004 | A | 2/1994 | Okada et al. | 250/306 |
| 5,289,044 | A | 2/1994 | Iwaki | 307/164 |
| 5,289,408 | A | 2/1994 | Mimura | 250/306 X |
| 5,297,130 | A | 3/1994 | Tagawa | 250/306 X |
| 5,299,184 | A | 3/1994 | Yamano | 250/306 X |
| 5,302,239 | A | 4/1994 | Roe et al. | 250/306 X |
| 5,307,311 | A | 4/1994 | Sliwa, Jr. | |
| 5,308,974 | A | 5/1994 | Elings et al. | 250/306 X |
| 5,317,152 | A | 5/1994 | Takamatsu | 250/306 |
| 5,317,533 | A | 5/1994 | Quate | 250/306 |
| 5,319,961 | A | 6/1994 | Matsuyama et al. | 73/105 |
| 5,319,977 | A | 6/1994 | Quate et al. | 250/306 X |
| 5,322,735 | A | 6/1994 | Fridez et al. | 428/357 |
| RE34,708 | E | * 8/1994 | Hansma et al. | 250/306 |
| 5,338,932 | A | 8/1994 | Theodore et al. | 250/306 |
| 5,343,460 | A | 8/1994 | Miyazaki | 250/306 X |
| 5,349,735 | A | 9/1994 | Kawase | 250/306 X |
| 5,353,632 | A | 10/1994 | Nakagawa | 73/105 |
| 5,354,985 | A | 10/1994 | Quate | 250/306 |
| 5,357,109 | A | 10/1994 | Kusumoto | 250/306 |
| 5,357,110 | A | 10/1994 | Statham | |
| 5,360,977 | A | 11/1994 | Onuki et al. | 250/306 |
| 5,362,963 | A | * 11/1994 | Kopelman et al. | 250/306 X |
| 5,373,494 | A | 12/1994 | Kawagishi | 369/126 |
| 5,389,475 | A | 2/1995 | Yanagisawa | 250/306 X |
| 5,392,275 | A | 2/1995 | Kawada et al. | 369/126 |
| 5,393,647 | A | 2/1995 | Neukermans et al. | 430/320 |
| 5,396,483 | A | 3/1995 | Matsuda | 369/283 |
| 5,408,094 | A | 4/1995 | Kajimura | 250/306 X |
| 5,412,641 | A | 5/1995 | Shinjo | 369/126 |
| 5,414,260 | A | 5/1995 | Takimoto et al. | 250/306 |
| 5,414,690 | A | 5/1995 | Shido et al. | 250/306 X |
| 5,416,331 | A | 5/1995 | Ichikawa et al. | 250/306 X |
| 5,418,363 | A | 5/1995 | Elings et al. | 250/306 |
| 5,426,631 | A | 6/1995 | Miyazaki et al. | 250/306 X |
| 5,453,970 | A | 9/1995 | Rust et al. | 250/306 X |
| 5,455,420 | A | 10/1995 | Ho et al. | 250/306 |
| 5,461,605 | A | 10/1995 | Takimoto et al. | 250/306 X |
| 5,463,897 | A | 11/1995 | Prater et al. | 73/105 |
| 5,471,458 | A | 11/1995 | Oguchi et al. | 250/306 X |
| 5,472,881 | A | 12/1995 | Beebe et al. | 250/306 X |
| 5,490,132 | A | 2/1996 | Yagi et al. | 250/306 X |
| 5,495,109 | A | 2/1996 | Lindsay et al. | 250/306 |
| 5,502,306 | A | 3/1996 | Meisburger et al. | 250/306 |
| 5,506,829 | A | 4/1996 | Yagi | 250/306 X |
| 5,510,615 | A | 4/1996 | Ho et al. | 250/306 |
| 5,519,686 | A | 5/1996 | Yanagisawa et al. | 250/306 X |
| 5,548,117 | A | 8/1996 | Nakagawa | 250/306 X |
| 5,559,328 | A | 9/1996 | Weiss et al. | 250/306 |
| 5,560,244 | A | 10/1996 | Prater et al. | 73/105 |
| 5,583,286 | A | 12/1996 | Matsuyama | 73/105 |
| 5,602,820 | A | 2/1997 | Wickramasinghe et al. | 250/306 X |
| 5,610,898 | A | 3/1997 | Takimoto | 369/126 |
| 5,623,476 | A | 4/1997 | Eguchi | 369/126 |
| 5,634,230 | A | 6/1997 | Maurer | 15/1.1 |
| 5,644,512 | A | 7/1997 | Chernoff et al. | 73/105 X |
| 5,679,952 | A | 10/1997 | Lutwyche et al. | 250/306 |
| 5,717,680 | A | 2/1998 | Yamano | 369/126 |
| 5,721,721 | A | 2/1998 | Yanagisawa | 250/306 X |
| 5,751,683 | A | 5/1998 | Kley | 369/126 |
| 5,756,997 | A | 5/1998 | Kley | 250/306 |
| 5,763,879 | A | 6/1998 | Zimmer et al. | 250/306 |
| 5,804,709 | A | 9/1998 | Bougoin et al. | 73/105 |
| 5,821,410 | A | 10/1998 | Xiang et al. | 73/105 |
| 5,825,670 | A | 10/1998 | Chernoff et al. | 73/105 X |
| 5,865,978 | A | 2/1999 | Cohen | 205/118 |
| 5,874,726 | A | 2/1999 | Haydon | 250/201.1 |
| 5,883,387 | A | 3/1999 | Matsuyama et al. | 250/306 |
| 5,922,214 | A | 7/1999 | Liu et al. | 216/2 |
| 6,031,756 | A | 2/2000 | Gimsewski et al. | 365/151 |
| 6,068,265 | A | 5/2000 | Galvin et al. | 216/2 |
| 6,101,164 | A | 8/2000 | Kado et al. | 250/306 X |
| 6,144,028 | A | 11/2000 | Kley | 250/306 X |
| 6,173,604 | B1 | 1/2001 | Xiang et al. | 73/105 |
| 6,199,269 | B1 | 3/2001 | Greco et al. | 29/700 |
| 6,201,226 | B1 | 3/2001 | Shimada et al. | 250/306 X |
| 6,229,138 | B1 | 5/2001 | Kley | 250/306 X |
| 6,229,607 | B1 | 5/2001 | Shirai et al. | 73/105 X |
| 6,229,609 | B1 | 5/2001 | Muramatsu et al. | 250/306 X |
| 6,232,597 | B1 | 5/2001 | Kley | 250/306 X |
| 6,239,426 | B1 | 5/2001 | Muramatsu et al. | 73/105 X |
| 6,242,734 | B1 | 6/2001 | Kley | 250/306 X |
| 6,249,747 | B1 | 6/2001 | Bennig et al. | |
| 6,252,226 | B1 | 6/2001 | Kley | 250/306 |
| 6,265,711 | B1 | 7/2001 | Kley | 250/306 |
| 6,281,491 | B1 | 8/2001 | Kley | 250/306 X |
| 6,337,479 | B1 | 1/2002 | Kley | 250/306 |
| 6,339,217 | B1 | 1/2002 | Kley | 250/306 X |
| 6,340,813 | B1 | 1/2002 | Tominaga et al. | 250/306 |
| 6,353,219 | B1 | 3/2002 | Kley | 250/306 X |
| 6,369,379 | B1 | 4/2002 | Kley | 250/234 |
| 6,396,054 | B1 | 5/2002 | Kley | 250/234 |
| 6,507,553 | B1 | 1/2003 | Kley | 369/126 |
| 6,515,277 | B1 | 2/2003 | Kley | 250/306 X |
| 6,517,249 | B1 | 2/2003 | Doll | 384/492 |

| | | |
|---|---|---|
| 6,573,369 B1 | 6/2003 | Henderson et al. |
| 6,614,227 B1 | 9/2003 | Ookubo .................... 73/105 X |
| 6,724,712 B1 | 4/2004 | Kley |
| 6,737,331 B1 * | 5/2004 | Lewis et al. ............ 250/306 X |
| 6,752,008 B1 | 6/2004 | Kley |
| 6,787,768 B1 | 9/2004 | Kley et al. |
| 6,802,646 B1 | 10/2004 | Kley |
| 2001/0010668 A1 | 8/2001 | Kley ....................... 369/44.14 |
| 2002/0007667 A1 | 1/2002 | Pohl et al. .................... 73/105 |
| 2002/0117611 A1 | 8/2002 | Kley .......................... 250/234 |
| 2002/0135755 A1 | 9/2002 | Kley ............................ 356/72 |
| 2002/0189330 A1 | 12/2002 | Mancevski et al. |
| 2003/0012657 A1 * | 1/2003 | Marr et al. .................... 417/48 |
| 2003/0027354 A1 * | 2/2003 | Geli ........................... 436/178 |
| 2003/0062193 A1 * | 4/2003 | Thaysen et al. ............ 174/255 |
| 2003/0089182 A1 * | 5/2003 | Thaysen et al. ....... 73/862.621 |
| 2003/0167831 A1 | 9/2003 | Kley .......................... 73/105 |

OTHER PUBLICATIONS

Davis "Deposition characterization and device development in diamond silicon carbide and gallium nitride thin films" J. Vac. Sci. Technol. A 11(4). Jul./Aug. (1993), partially illegible pp. 829, 832–837.

Diaz et al., An Improved Fabrication Technique for Porous Silicon, Rev. Sci. instrum.64 (2), Feb. 1993, pp. 507–509.

Givargizov et al "Growth of diamond particles on sharpened silicon tips" Materials Letters 18:(1993), Nov. 1993, pp. 61–64, No. 1, 2.

Gomyo et al. Effect of Electrochemical Treatments on the Photoluminescence from Porous Silicon, J. Electrochem. Soc., vol. 139, No. 9, Sep. 1992, pp. L86–L88.

Nossarzewska–Orlowska et al., Photoluminescence Properties of Porous Silicon Prepared by Electrochemical Etching of Si Epitaxial Layer, Acta Physica Polonica A, No. 4. vol. 84 (1993), pp. 713–716, month not given.

Rasmussen et al. "Fabrication of an All–metal Atomic Force Microscope Probe," IEEE (1997), month not given, pp. 463–466.

Rossow et al., Influence of the Formation Conditions on the Microstructure of Porous Silicon Layers Studied by Spectroscopic Ellipsometry, Thin Solid Films, 255 (1995), pp. 5–8, month not given, partially illegible.

Smestad et al., Photovoitaic Response in Electrochemically Prepared Photoluminescent Porous Silicon. Solar Energy Materials and Solar Cells, 26 (1992), pp. 277–283, month not given.

Tang "Electrostatic comb drive for resonant sensor and actuator applications," Abstract of dissertation at the University of California at Berkeley (1990), 1 page, month not given.

Toledo–Crow et al "Near–field differential scanning optical microscope with atomic force regulation" Appl. Phys. Lett. 60: (1992), Jun. pp. 2957–2959.

Van Hulst et al "Near–field optical microscope using a silicon–nitride probe" Appl. Phys. Lett. 62: (5) (1993) Feb. pp. 461–463.

Watson et al "The Radiation Patterns of Dielectric Rods–Experiment Theory" Journal of Applied Physics 19: (1948), Jul. pp. 661–670.

Jaschke et al. "Deposition of Organic Material by the Tip of a Scanning Force Microscope," Langmuir 11:1061–1064 (1995), month not given.

* cited by examiner

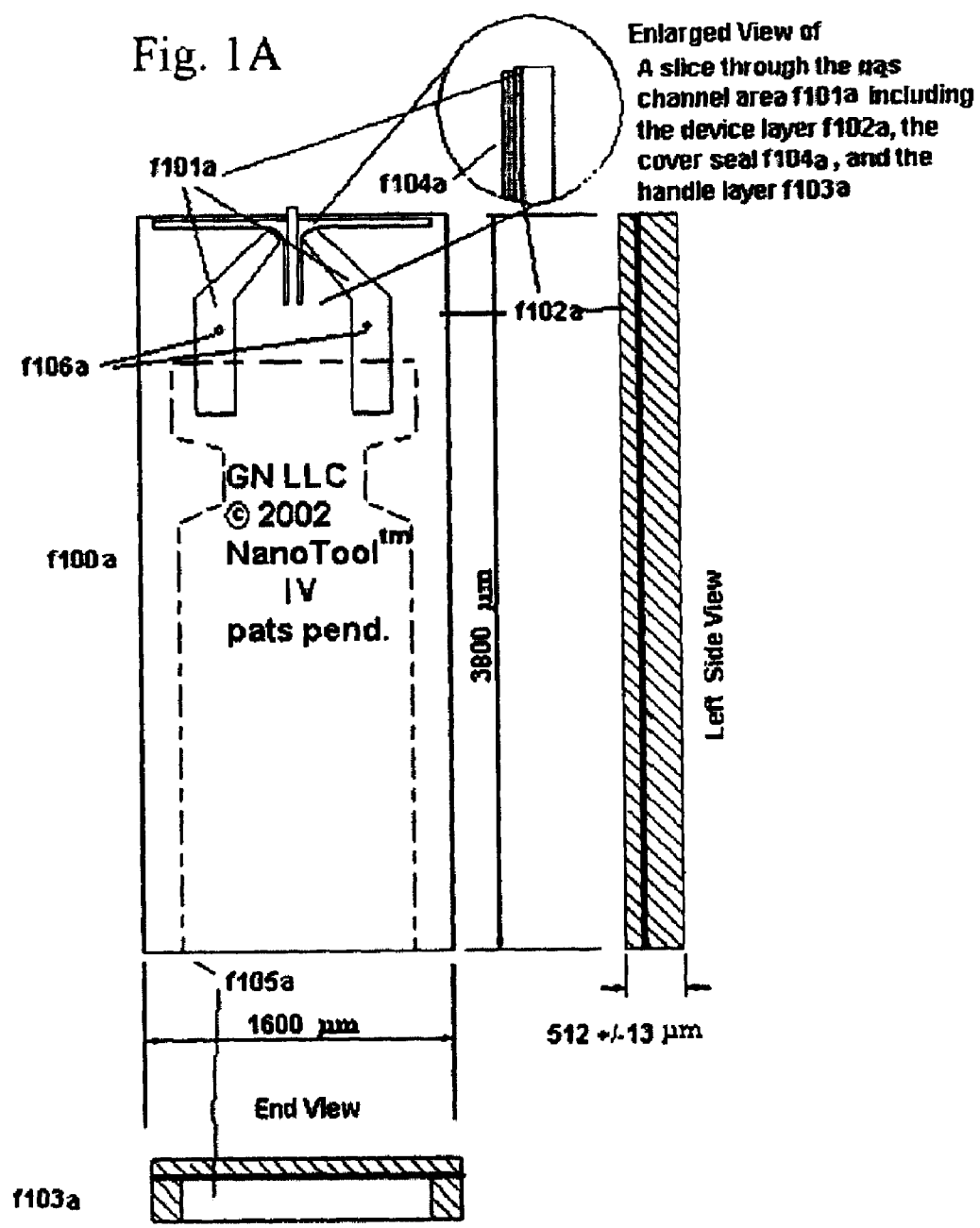

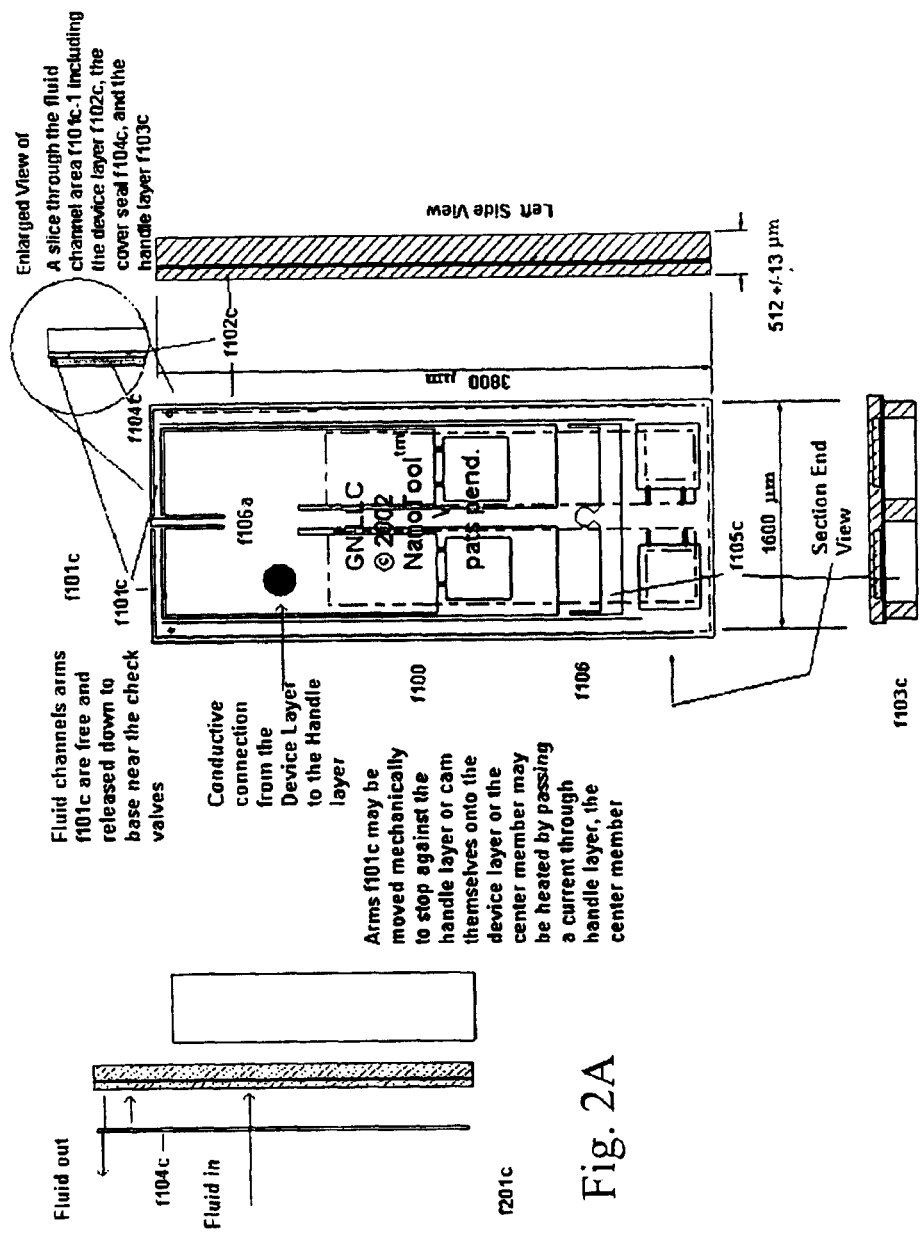

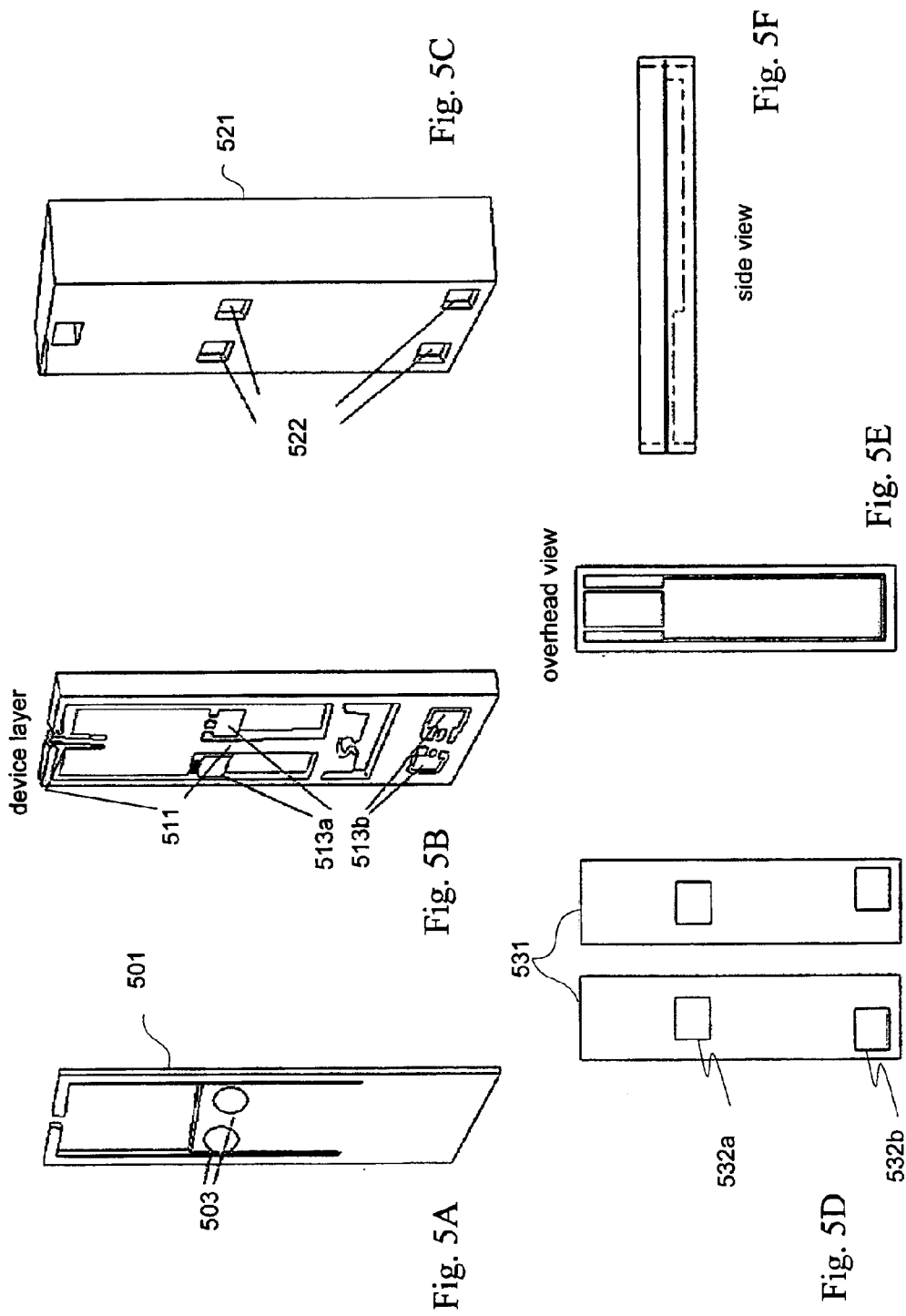

FLUID DELIVERY FOR SCANNING PROBE MICROSCOPY

CROSS-REFERENCES TO RELATED APPLICATIONS

This application claims priority from U.S. Provisional Application No. 60/409,403, filed Sep. 9, 2002 and from U.S. Provision Application No. 60/433,242, filed Dec. 12, 2002, the disclosures of which are hereby incorporated in their entirety for all purposes.

This application is related to U.S. application Ser. Nos.:
Ser. No. 10/094,149, filed Mar. 7, 2002, now U.S. Pat. No. 6,802,646;
Ser. No. 10/094,411, filed Mar. 7, 2002;
Ser. No. 10/094,408, filed Mar. 7, 2002, now U.S. Pat. No. 6,923,044;
Ser. No. 10/093,842, filed Mar. 7, 2002;
Ser. No. 10/094,148, filed Mar. 7, 2002, now U.S. Pat. No. 6,752,008; and
Ser. No. 10/228,681, filed Aug. 26, 2002, now U.S. Pat. No. 6,880,388,
the disclosures of which are hereby incorporated by reference for all purposes.

BACKGROUND OF THE INVENTION

The present invention relates generally to microelectromechanical systems (MEMS), and in particular to techniques for fluid delivery in applications involving nanometer-scale operations, such as assays and/or amplification and subsequent modification of DNA in biochips. In addition this invention can be used to remove or add material via chemical, electrochemical, biochemical, mechanical and electrical methods in small controlled regions down to atomic dimensions of 0.1 nanometer.

Nanometer-scale components find utility in a wide variety of fields, particularly in the fabrication of microelectromechanical systems (MEMS). Typical MEMS include microsensors, micro-actuators, micro-instruments, micro-optics, and the like. Nanotechnology refers to broad categories of nanometer-scale manufacturing processes, materials and devices, including, for example, nanometer-scale lithography and nanometer-scale information storage. Many MEMS fabrication processes exist, including, for example surface micromachining techniques. Surface micromachining involves fabrication of microelectromechanical systems from films deposited on the surface of a substrate. For example, a common fabrication process includes depositing thin layers of polysilicon on a sacrificial layer of silicon dioxide formed on a bulk silicon substrate. Controlled removal of the selected portions of the various layers of material can produce useful micro- and nano-scale machine components.

Conventional semiconductor processing typically is performed in vacuum. The nature of the surrounding ambient is important. Often a dry ambient is required to avoid oxidizing and otherwise contaminating the surface of the silicon surface. Presently static conditions, vacuum generation, moisture problems and/or chemical reactivity control is obtained in SPM (scanning probe microscopy) systems and nanomachining centers by the introduction of large quantities of gas (including CDA, clean dry air) at some distance many inches or more away from the probe subject site. These gross-scale manipulations of fluid are at odds with the fine-scale operations required in nanotechnology-based machining systems. To date, no suitable techniques exist to provide for more effective gas and vacuum delivery in the proximity of a site being worked by a nanomachining process.

SUMMARY OF THE INVENTION

A micro electromechanical systems (MEMS) device is configured with fluidic channels to perform various tasks, including measuring and nanomachining a workpiece. One or more isotopic regions can be provided to further enhance the measuring function and to enhance nanomachining operations. The isotopic region(s) can provide power to a workpiece.

BRIEF DESCRIPTION OF THE FIGURES

FIG. 1A shows a variation of the MEMS cantilever illustrated in FIG. 1;

FIG. 2A illustrates fluidic flow in accordance an embodiment of the present invention;

FIGS. 5A–5F illustrate views of a cantilever configured with valves for gas flow in accordance with an aspect of the present invention; and FIG. 6 shows a variation of the cantilever configuration illustrated in FIGS. 5A–5F.

DESCRIPTION OF THE SPECIFIC EMBODIMENTS

Figure 1:
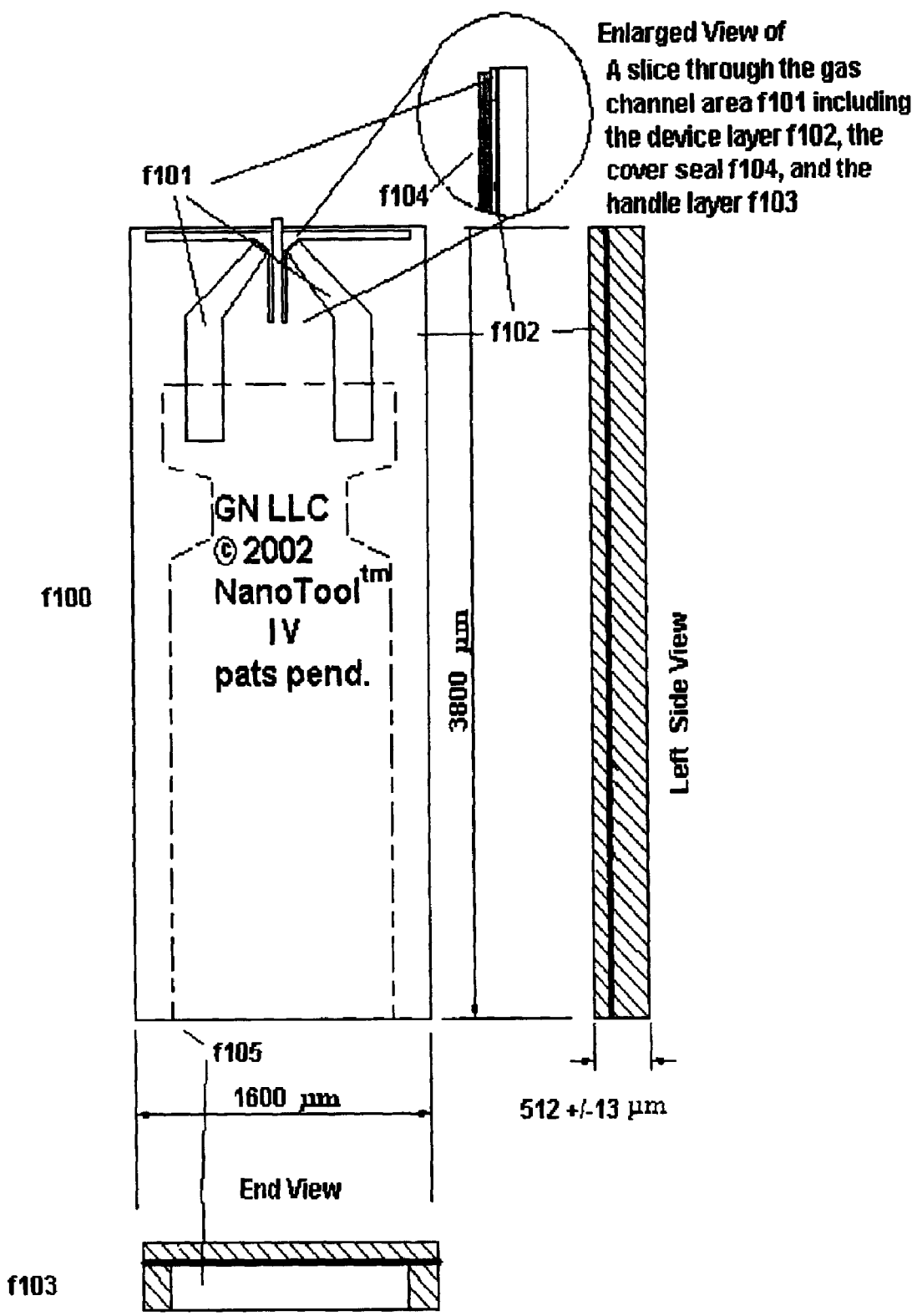
FIG. 1 is a schematic illustration of an embodiment of a micro electro-mechanical systems (MEMS) cantilever according to one aspect of the present invention.

FIG. 1 shows an SOI (silicon on insulator) MEMS cantilever f100 having gas channels f101 formed in the device layer. Each channel is fed via a recess f105 (shown in phantom) formed in the body of in the handle layer f103 of the cantilever f100. The recess is therefor in fluid communication with the channels f101. Gas introduced through the floor plate or gas feed tube (not shown) from a gas source (not shown) is thereby delivered via the recess f105 to the channels f101 and finally to a region of the tip at the end of the cantilever f100.

As can be seen in the enlarged view, a cover seal (or cover layer) f104 can be provided to contain the gas pressure that can be developed at the tip. In one embodiment, the cover seal can be any suitably patterned thin material including adhesive plastic films, silicon cover structure, or diamond film cover structure. These latter materials may be bonded by coating with Titanium, Nickel and Copper layers to make a Copper vacuum furnace bond, or by using conventional low temperature eutectic bonds such as a Ge/Ag, Ge/Au, In/Pt, In/Pa or In/Ag to a similarly coated device layer or other mechanically strong layer sufficient to contain the gas pressures used. This latter cover layer may be disposed so as to reduce the etched gap between the arms and the tip portion of the primary cantilever and in fact may overlap the cantilever end if it is suitably relieved by etching or other means to have clearance similar or identical to the clearance between the back of the primary cantilever and the secondary cantilever or a backing beam.

Figure 2:
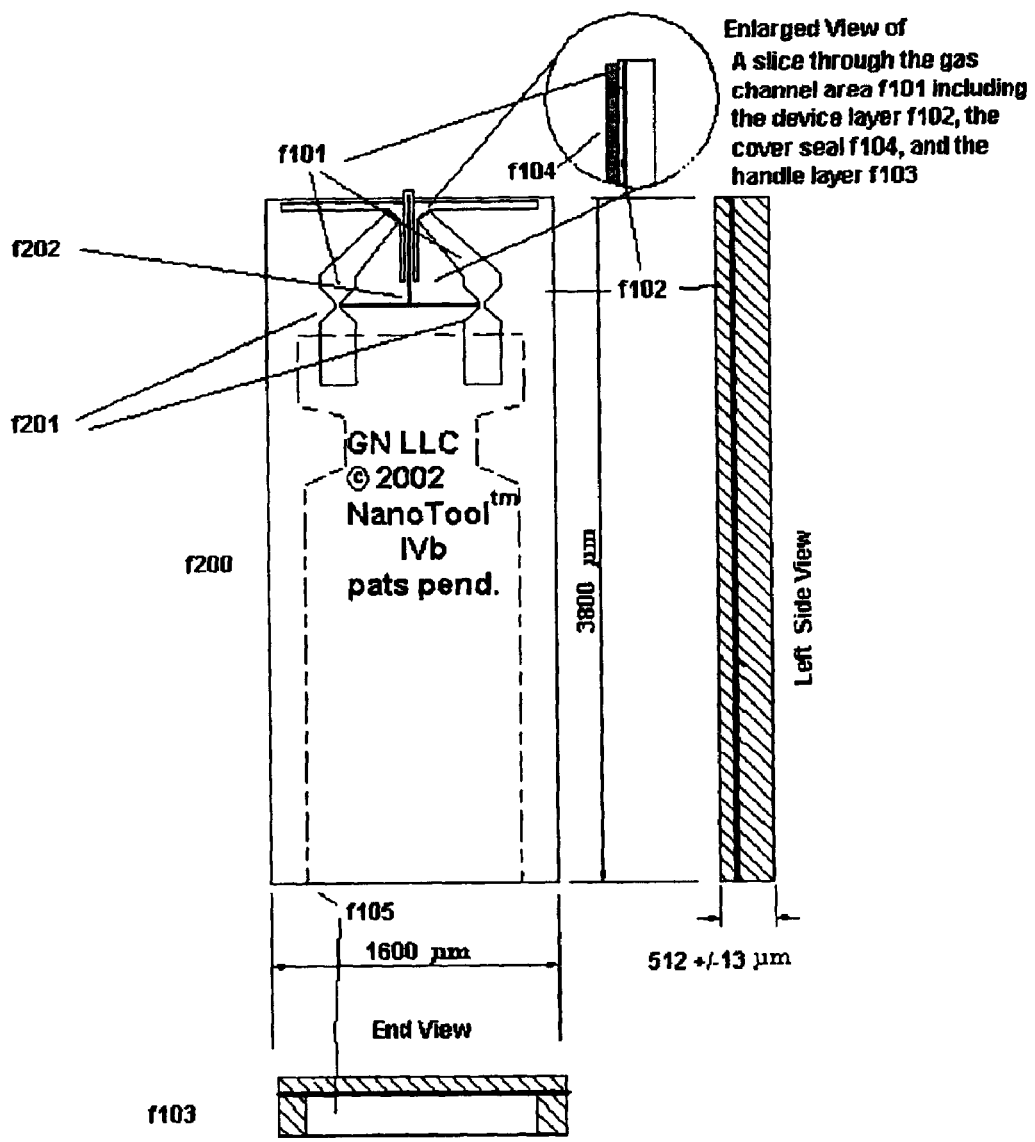
FIG. 2 is a schematic illustration of another embodiment of a MEMS cantilever according to another aspect of the present invention.

In FIG. 2, a variation of the cantilever structure illustrated in FIG. 1 is shown. In this variation of the cantilever f200, venturi structures f201 (venturi tubes) are formed in a portion of the gas channels f101. Tubes f202 lead away and interconnect to the area of the tip on the cantilever to provide a vacuum that is suitable for special functions such as new measurement and material modification means. A vacuum produced by this configuration may also be used for other purposes including a vacuum clamping system which retains the whole assembly (including an attached base plate on the handle layer) onto the instrument or tool in use.

Figure 3:
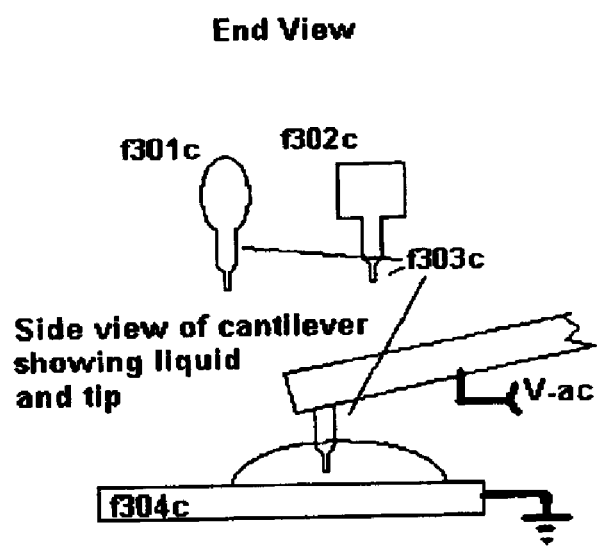
FIG. 3 is a diagrammatic illustration of a cantilever tip used in the formation of a microbubble or a nanobubble in accordance with an aspect of the present invention.

In FIG. 2 and also in FIGS. 1A and F1B, a fluid (e.g., water) may be placed in the gas channel or delivered to the gas channel using the same mechanism and pathways as the selected gases described herein. Here as shown in FIG. 3 a tip with a flat end directly proportional in diameter to the desired microbubble or nanobubble to be formed is driven by (typically) a piezoelectric excitation system. The excitation system can be the same system that is used to excite the cantilever for AFM scanning, for example. The excitation system increases its amplitude such that cavitation bubbles are formed at the end of the tip and at a known distance away from the work surface. These cavitation bubbles may be used to machine a target surface. The cavitation bubbles can be used to illuminate, by the sonoluminescence effect, a particular spot on a work piece, or initiate a photo induced reaction into a work piece. The target piece or workpiece can be viable DNA.

The fluid can be withdrawn from the area of the tip using the capillary action within the fluid, the maintenance of wetable surfaces in the channel, and the application of some backpressure on the fluid. Additionally, as shown in FIGS. 1A and 2A, fluid (including gas) may be continuously removed and replenished or otherwise recirculated after being modified (for example, due to filtering, cooling or heating, or otherwise chemically changed) so as to maintain specific conditions at the tip and sample. Alternatively, the fluid may be expelled in metered ways from the ends of the gas channel by a pulse pressure.

Figure 2B:
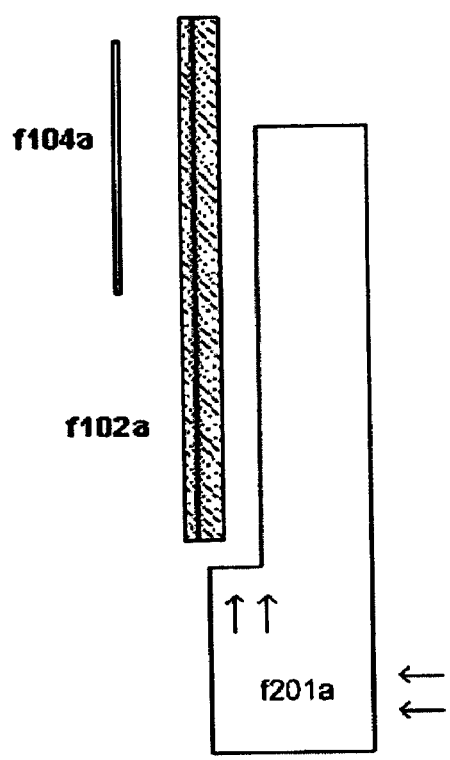
FIG. 2B is an exploded side view showing fluid flow in accordance with an embodiment of the present invention.

FIG. 2B is a schematic exploded side view of a holder f201a and a cantilever f102a received in the holder. A cover seal f104a is shown separated from the cantilever f102a. The holder f201a is configured for fluid flow in the direction shown by the arrows. Fluid enters from the right-bottom portion of the holder f201a, exiting the holder at a location where the base of the cantilever f102a is received. With reference to FIG. 1, the fluid exiting the holder f201a enters the recess f105 from the base of the cantilever f102a.

Figure 2C:
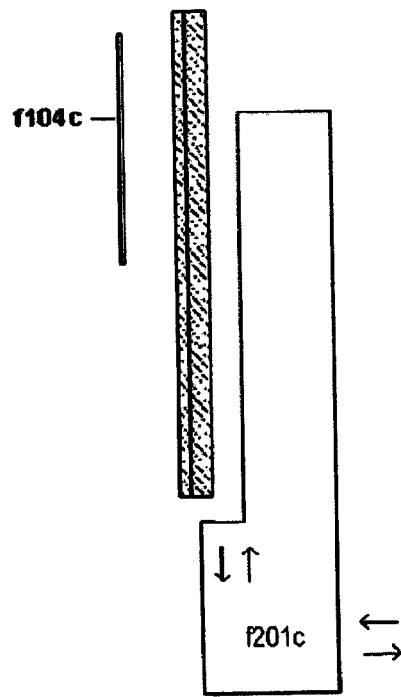
FIG. 2C is an exploded side view showing fluid flow in accordance with another embodiment of the present invention.

FIG. 2C is a schematic exploded side view of a holder f201c and a cantilever received in the holder. A cover seal f104c is shown separated from the cantilever. The holder f201c is configured for bi-directional fluid flow as shown by the arrows. Fluid enters and exits from the right-bottom portion of the holder f201c, exiting and entering the holder at a location where the base of the cantilever is received.

FIG. 5 illustrates a cantilever configured with valves for gas flow in accordance with an aspect of the present invention. The cantilever includes a channel cover 501 which is about 10–20 microns thick. The cover is configured with intake holes 503 over intake valves 513a. The device layer portion of the cantilever shows primary cantilever flexible fluid channels with thermal actuator 511. The device layer includes intake check valves 513a and outflow check valves 513b. A handle layer 521 shows a cutout with beam support (instead of secondary cantilevers). The handle layer includes fluid passages 522 to the two fluid chambers. Handle cavities 531 are shown with intake ports 532a and outflow ports 532b. An overhead view is shown of one of two flapper inserts placed or bonded into the main cantilever body handle cavity. The cavity is about 400 microns deeps as is the insert. A side view shows flapper end walls (dotted lines) of the flapper assembly ready to be inserted into the cantilever handle cavity. Assembly is made from 400 micron SQI 1-0-0 silicon with a 200 micron device and 200 micron handle layers.

In another embodiment, chemical, optical and/or electrical means may be provided through and/or with the tip to perform measurements at the tip region, or to effect other processes in the region of the tip with or without the benefit of fluid or gas delivered to the tip region. One or more streams of gas and/or fluid delivered to the tip region may also be used to induce reactions or processes suitable to the goals of measurement or process development. Specifically these latter techniques are well suited to be used with biological or chemical cell assemblies, sometimes referred to as biochips, such as those made by Affymetrix. In a biochip, the local region of fluid control and/or tip activity is substantially smaller than the size and volume of the biochip cell. Furthermore these biochips are commonly caused to fluoresce on the activated DNA sites and the resulting light emission in conjunction with light sensitive tips can be used to locate the actual DNA directly. The DNA can then be removed and moved to another location for further operations. The DNA can be processed on site in the biochip. This light driven location would simply consist of monitoring the light received by the control computer or logic and/or memory and then mapping the region(s) of maximum and minimum light output for operations to be directed subsequently by the operator or a computer and or logic and/or memory based director. Alternately the fluid may be expelled in metered ways from the ends of the gas channel by a pulse pressure.

In still another embodiment, one or more diaphragms (electrostatically, piezoelectrically, or thermally actuated) can be integrated into the cantilever f100 via known MEMS techniques to provide gas flow (such as by applying a vacuum or lower pressure to the channels) or fluid flow through the channels from a source of gas or fluid that is provided to the device. Alternatively, a co-resonant pendulum pump with or without valves (as shown in the views of FIGS. 5a–5F, and/or thermal (pressure differential by fluid or gas heating) pumps can be incorporated into the cantilever f100 also using known MEMS techniques to provide gas or fluid to the tip. This aspect of the invention avoids having to directly connect the cantilever to an external supply to provide the fluid flow and control. A local and/or MEMS based flow control may also be used to regulate an external supply or server as an additional regulation of the diaphragm or thermal pumps above.

Further the fluid or gas may be further shaped and guided by the arrangement shown in FIG. 1C so that the flow is orthogonal to the cantilever and below the lowest part of the cantilever so that the region of flow is not in contact with the cantilever. Alternatively, the cantilever shown in FIG. 3, at f301c, is streamlined to lower its damping by the fluid and to eliminate the formation in liquids of cavitation bubbles from the surfaces orthogonal to its motion. Additionally the channel arms may be movable and can be configured to have a spring constant such that a sufficiently strong vacuum source applied to the channels causes the arms to mechanically engage the tip platform. This would mechanically constrain its motion or make it move toward one channel or the other (the channel in which the vacuum is applied). The mechanical constraints are removed when normal or positive pressure is applied to channel(s). By this means, the tip platform may be moved or scanned over the surface or clamped in between the channels alternate means well know in the MEMS art may be used to move the channel arms in x,y and z axis including independent thermal, electrostatic and piezoelectric translation of all or any of the arms. Furthermore, the channel arms may be arranged to lie over secondary cantilevers (which are described in more detail in one or more of the above-referenced applications) such that these cantilevers do not extend to the area of the primary cantilever. Instead, when the movable arms are used to clamp the primary cantilever the whole clamped assembly is free to move back until each clamp arm of the assembly encounters a secondary cantilever with a corresponding increase in spring constant from these structures. Furthermore when driven independently, the instant of electrical contact of any given arm with the structure to be clamped can be sensed and used by an external controller or analog circuit to control the clamping force and motion of the arm so that a given displacement of the clamped structure can be obtained (including zero displacement). The motion of the arms can also be sensed by conventional piezoelectric and piezoresistive methods.

Figure 1B:
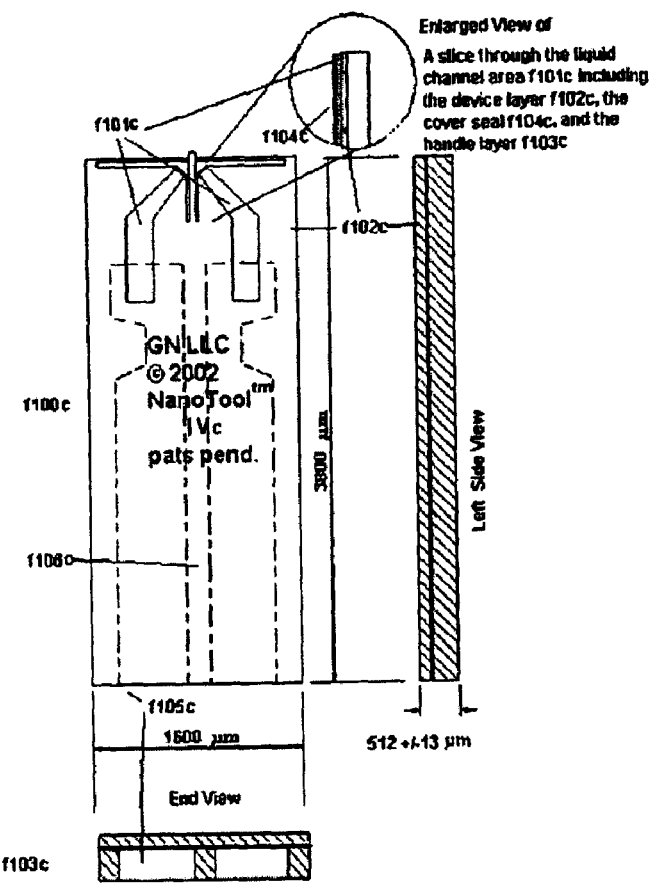
FIG. 1B shows yet another variation of the MEMS cantilever illustrated in FIG. 1.

Furthermore as shown above in FIG. 2 and FIGS. 1A and 1B, another fluid and in particular a dielectric fluid, like electrical discharge machining oil (typically, a kerosene like oil well known in the machine tool industry) may be introduced around the work piece (tool form to form a particular shape on the tip by suitably placing a bias voltage—dc offset ac voltage or simple dc voltage under which workpiece or sample material will be removed from the anode whether that is the work piece or the GN probe see FIG. 3). For this purpose, conductive diamond is especially appropriate because its ability to conduct away heat reduces its erosion wear substantially. Another useful material is tungsten.

Figure 1C:
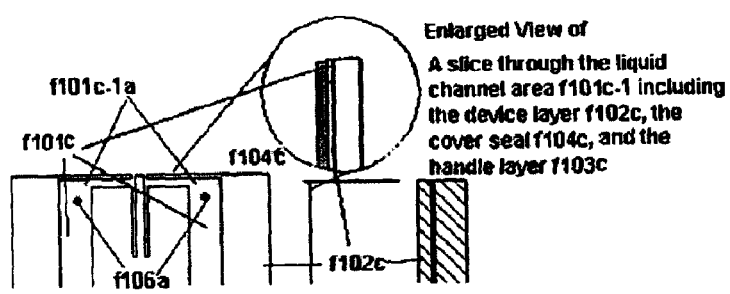
FIG. 1C shows a variation of the MEMS cantilever illustrated in FIG. 1B.
Figure 4:
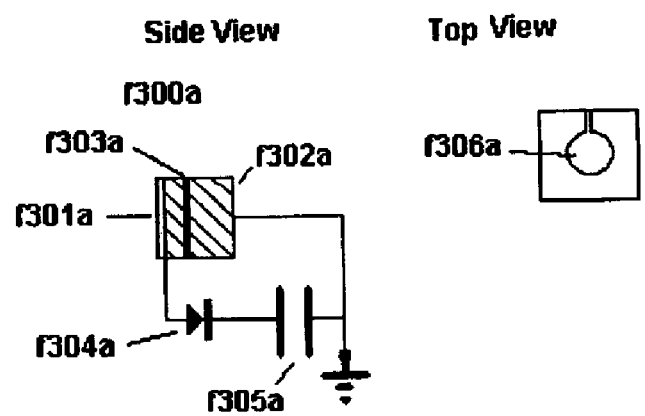
FIG. 4 is a schematic representation of a cantilever tip configured as a nanogenerator in accordance with an aspect of the present invention.

Finally, in either embodiment shown in FIG. 1, 2, or 1C, a conventional isotope or electrical emitters may be introduced in the main gas channel f105 formed in the handle f103, or in the individual gas channels f101 in the device layer via openings f106a. A further embodiment is to use a total of 0.99 or less microcurie of radioactive material in total (sum of all material applied to the device) in order to meet national and international maximums for unregulated transport and use of radioactive materials. Another embodiment is to use Americium 241 which is commonly used in smoke detectors as the isotopic source of alpha particles. These emitters will form ions in the gas flowing around them which can then be used to charge or neutralize charge around the tip area where measurement or surface modification is taking place. The gas flow rate determines the charge transfer rate out of the channels. The gas flow can be monitored by conventional measuring by techniques the charge across the channel through connections. This aspect of the invention is shown in FIG. 4. The voltage is measured at the integration point (connection between the diode and the capacitor) with a resistor discharging the voltage so as to correlate with rate of charge transfer and removal by gas flow.

A further embodiment of the nuclear emitter is shown in FIG. 4. Here a complete nanogenerator is formed in which the electrical energy of nuclear decay from an isotope at f306a is captured by conductive layer f301a which may be in close contact. An intrinsic silicon diode, or intrinsic diamond diode, or intrinsic SiC diode formed by CVD (chemical vapor deposition) growth of an oriented boron doped diamond layer followed by the growth of an intrinsic or ultrapure undoped diamond layer or diode junction is electrically arranged to provide a current of secondary holes or electrons from the ionizing action (attached to the device layer which may also be conductive) and insulated from the ground layer on which the isotope is electrodeposited or affixed at f302a. This voltage is then integrated by the simple diode and capacitor circuit shown as f304a and f305a. The diode and capacitor may be integrally formed on the silicon MEMS device. In this way, a quantity of current is available for any general use by making a connection to the conductor that connects f304a and f305a. Many nanogenerator regions may be made and integrated on one device such that under normal circumstances no local concentration of isotopic material will exceed the legally accepted microcurie concentration per unit area of the device. Furthermore the intrinsic diode may be spaced away from the radiation source by a hard vacuum and an internal thin metal diaphragm which may be released by the passage of current through one of its support arms allowing the other support bar to roll it up and out of the way of the radiation source. By the latter means the generator diode can be protected from radiation damage while in storage and the storage life can be extended to hundreds of years.

In another embodiment, the intrinsic diamond layer may be grown or mechanically contacted against a doped SiC (silicon carbide) crystal with a boron doped diamond layer (either random or aligned biased grown) grown on the other side of the intrinsic diamond away from the SiC. An additional embodiment includes a conductor followed by an intrinsic SiC layer grown on top of a doped SiC layer. In this and the former embodiments, these structures may also be used as radiation detectors for forms of radiation which give rise to detectable electronic or optical changes in the layered diode structure.

Yet another embodiment of the above elements includes the provision for active mechanical and/or electrical actuation of the gas/fluid channels (see above and the drawings of FIG. 6 which includes a conductive connection 601 from the device layer to the handle layer). The channels can be moved into and away from the tip platform, to act as a clamp or release on the primary cantilever tip platform. Arm motion may be accomplished by one or more independent thermal actuators (see FIG. 6), electrostatic actuators, or piezoelectric actuators. Fluid channel arms f101c are free and released down to the base near the check valves. The arms f101c may be moved mechanically to stop against the handle layer or cam themselves onto the device layer or the center member may be heated by passing a current through handle layer and the center member. The arms may be used to stiffen or immobilize the tip bearing cantilever without the presence or aid of secondary cantilevers or beams behind the primary cantilever.

In operation if the tip platform is pressed back to the secondary cantilevers or support beam and the fluid channel is flexed in the channel cams and locks the platform against the secondary cantilevers or beam, If on the other hand the tip platform is not pressed back, then the edges of the fluid channel wedge under the tip platform and separate it positively from the secondary cantilevers or beam. In operation, this design may include two paddles on long cantilevers within the handle layer rear fluid channels. These respond to long wavelength modulation of a typical AFM acoustic top drive to move up and down perpendicular to the plane of the cantilever assembly and in conjunction with the check valves and/or openings depending from the front cover and form the handle cavities to the two fluid arms act to pump surrounding gas or fluid through the channels over the tip and subject area. The quantity of fluid or ionized gas can be controlled by a software module which allows the operator to change the duty cycle of the long wave caustic excitation.

What is claimed is:

1. A micro electromechanical systems (MEMS) device comprising:
   a scanning probe microscopy (SPM) component;
   one or more fluidic channels formed in the SPM component;
   one or more control valves to control a flow of fluid in the one or more fluidic channels; and
   one or more movable members formed in the SPM component, at least one fluidic channel being formed in each movable member, wherein fluid flow through the at least one fluidic channel produces movement in the movable member.

2. The MEMS device of claim 1 further comprising a cantilever formed in the SPM component and operatively coupled to the moveable members, wherein movement in the movable members serves to move the cantilever.

3. A method for nanomachining using a MEMS device, the MEMs device comprising:
   a scanning probe microscopy (SPM) component;
   one or more fluidic channels formed in the SPM component;
   one or more control valves to control a flow of fluid in the one or more fluidic channels; and
   one or more movable members formed in the SPM component, at least one fluidic channel being formed in each movable member, wherein fluid flow through the at least one fluidic channel produces movement in the movable member, the method including using the one or more movable members to perform nanomachining.

4. A micro electromechanical systems (MEMS) device comprising:
   a scanning probe microscopy (SPM) component;
   at least one fluidic channel formed in the SPM component; and
   a venturi tube formed along a portion of the fluidic channel,
   wherein a vacuum can be developed by a flow of a gas or fluid through the venturi tube.

5. A micro electromechanical systems (MEMS) device comprising:
   a scanning probe microscopy (SPM) component;
   one or more movable members formed in the SPM component;
   a fluidic channel formed in a first movable member, the fluidic channel configured to deliver fluid to a tip of the SPM component;
   one or more control valves formed in the SPM component to control a flow of fluid in the fluidic channel; and
   an amount of an isotope disposed along the fluidic channel,
   wherein particles emitted by the isotope can be delivered by a fluid flowing in the fluidic channel to the tip to affect charge distribution in a region about the tip.

6. The MEMS device as recited in claim 5 wherein the isotope is Americium 241.

7. The MEMS device as recited in claim 5 wherein the amount of isotope is disposed in a single isotopic region on the SPM device, wherein the single isotopic region contains 1 microcurie or less of radioactivity.

8. The MEMS device of claim 5 wherein the fluid flow comprises one of moving fluid from the fluidic channel formed in the first moveable member to create at least a partial vacuum thereby effecting movement of the first moveable member and moving fluid into the fluidic channel formed in the first moveable member wherein a force of the fluid effects movement of the first moveable member.

9. The MEMS device of claim 5 wherein fluid flow through the at least one fluidic channel produces movement in the first movable member.

10. The MEMS device of claim 9 further comprising a cantilever formed in the SPM component and operatively coupled to the moveable members, wherein a fluidic channel is formed in each moveable member, wherein movement in the movable members serves to move the cantilever.

11. The MEMS device as recited in claim 5 wherein the moveable members act as passive elements.

12. The MEMS device as recited in claim 5 wherein the moveable members produce electrical signals during movement, wherein the electrical signals serve to control subsequent movements.

13. The MEMS device as recited in claim 12 wherein the electrical signals serve to obtain one of a predetermined motion of a first moveable member, a predetermined displacement of the first moveable member, a zero displacement position of the first moveable member.

14. The MEMS device as recited in claim 5 further comprising a circuit for monitoring changes in charge accumulation in the fluidic channel as the isotope is moved by fluid flow.

15. A method for performing nanomachining on a workpiece using a MEMs device, the MEMs device comprising:
   a scanning probe microscopy (SPM) component;
   one or more movable members formed in the SPM component;
   a fluidic channel formed in a first movable member, the fluidic channel configured to deliver fluid to a tip of the SPM component;
   one or more control valves formed in the SPM component to control a flow of fluid in the fluidic channel; and
   an amount of an isotope disposed along the fluidic channel,
   wherein particles emitted by the isotope can be delivered by a fluid flowing in the fluidic channel to the tip to affect charge distribution in a region about the tip, wherein the particles are delivered to the tip, the method including using the tip to perform nanomachining on a workpiece.

16. A method of performing a nanomachining operation comprising manipulating a device relative to a surface, including constraining motion of the device in a specific or constrained region,
   the device comprising:
   a scanning probe microscopy (SPM) component;
   one or more movable members formed in the SPM component;

a fluidic channel formed in a first movable member, the fluidic channel configured to deliver fluid to a tip of the SPM component;

one or more control valves formed in the SPM component to control a flow of fluid in the fluidic channel; and an amount of an isotope disposed alone the fluidic channel, wherein particles emitted by the isotope can be delivered by a fluid flowing in the fluidic channel to the tip to affect charge distribution in a region about the tip.

17. A method as in claim 16 in which the nanomachining operation uses chemical or biological chips or devices in which material therefore is placed in wells in a regular arrangement on a plane or surface(s).

18. A method as in claim 17 in which the material is DNA which has been marked optically, electrically or chemically so as to interact with optical, electrical or chemical detectors or emitters associated with or integrated in the device.

19. A method for nanoelectric discharge machining using a MEMS device, the method comprising imaging a surface to be machined and measuring surface features of the surface to be machined, the imaging and measuring being performed using a scanning probe microscopy technique the MEMs device comprising:

a scanning probe microscopy (SPM) component;

one or more movable members formed in the SPM component;

a fluidic channel formed in a first movable member, the fluidic channel configured to deliver fluid to a tip of the SPM component;

one or more control valves formed in the SPM component to control a flow of fluid in the fluidic channel; and an amount of an isotope disposed alone the fluidic channel, wherein particles emitted by the isotope can be delivered by a fluid flowing in the fluidic channel to the tip to affect charge distribution in a region about the tip.

20. A micro electromechanical systems (MEMS) device comprising:

a scanning probe microscopy (SPM) component;

a fluidic channel formed in the SPM component, the fluidic channel configured to deliver fluid to a tip of the SPM component;

an amount of an isotope disposed along the fluidic channel, wherein particles emitted by the isotope can be delivered by a fluid flowing in the fluidic channel to the tip to affect charge distribution in a region about the tip; and a circuit for monitoring changes in charge accumulation in the fluidic channel as the isotope is moved by a flow of fluid.

* * * * *